Figure 1:
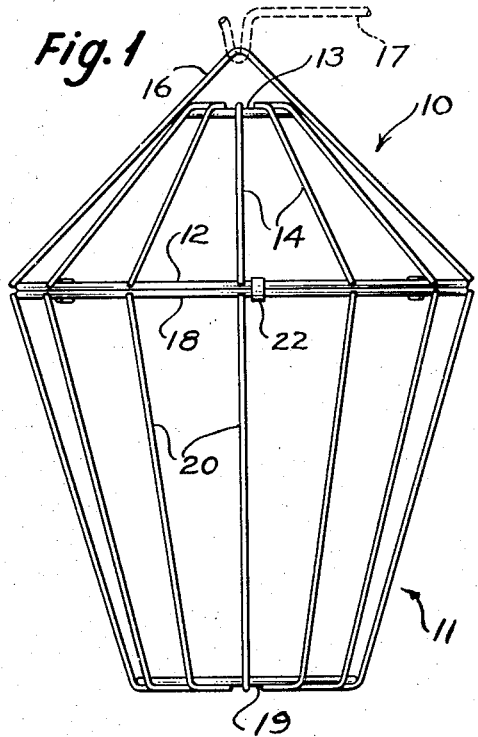

April 13, 1948.   P. H. PLANETA   2,439,548
METHOD FOR MAKING SUPPORTS
Filed Sept. 14, 1943   2 Sheets-Sheet 1

INVENTOR
PAUL H. PLANETA
BY
William A. Zalusak
ATTORNEY

April 13, 1948.　　　P. H. PLANETA　　　2,439,548
METHOD FOR MAKING SUPPORTS
Filed Sept. 14, 1943　　　2 Sheets-Sheet 2
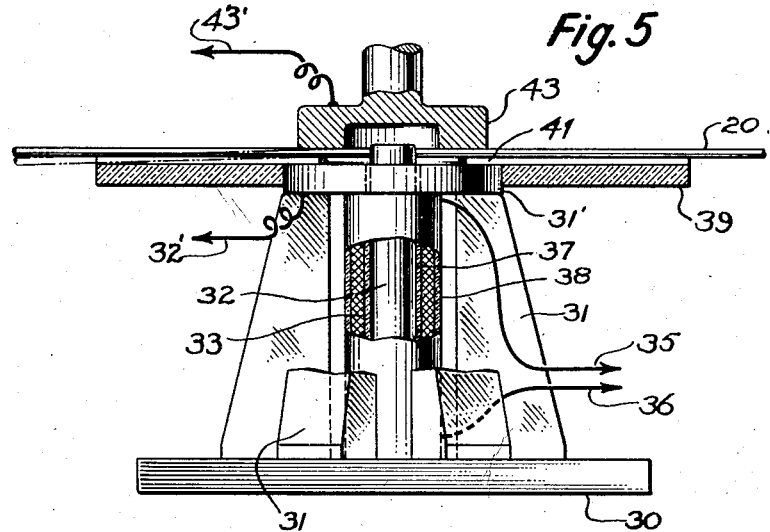
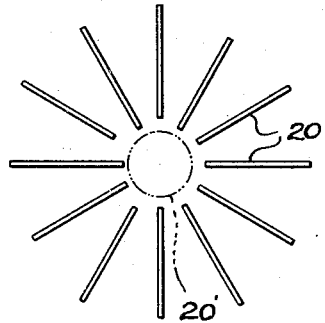
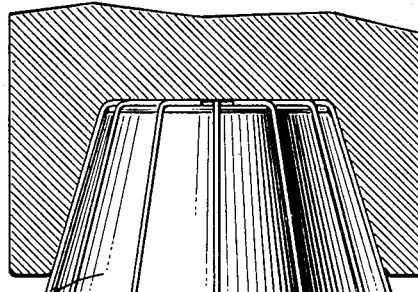
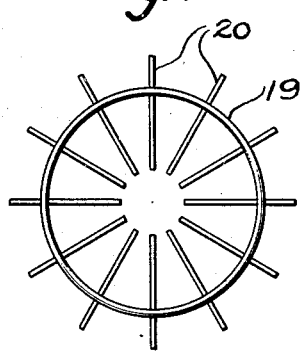
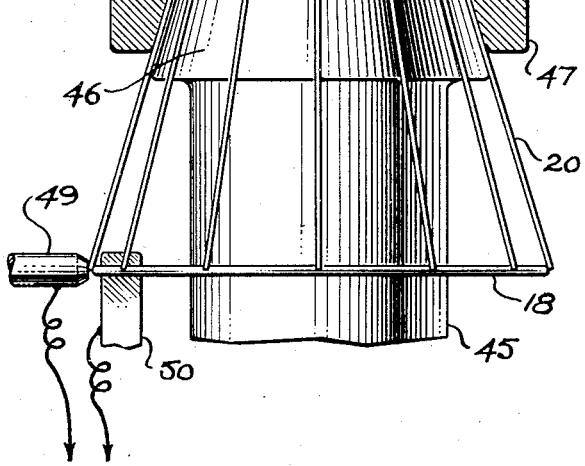
INVENTOR
PAUL H. PLANETA
BY
William A. Zalesak
ATTORNEY

UNITED STATES PATENT OFFICE 2,439,548

METHOD FOR MAKING SUPPORTS

Paul H. Planeta, Linden, N. J., assignor to Anthony Planeta, Linden, N. J.

Application September 14, 1943, Serial No. 502,269

5 Claims. (Cl. 140—71)

My invention relates to an improved form of ornamental support or holder, particularly to such a support or holder for a flower pot or the like, and the method for making the same.

A novel type of such support of recent design has the appearance of a bird cage and may contain, for example, a flower pot for holding flowers. These supports are usually made as a complete unit and as a result require a large amount of space for shipment, which is costly. In order to permit insertion of a container or pot, for example, a flower pot with flowers, it is necessary to provide an extra large door in the side of the cage, which results in complicating the structure and hence increasing its expense. Inserting a pot with flowers through the door also subjects the plant to injury by breaking when it is placed within the support. A second method of providing entry into the cage is to provide a separate sheet metal bottom, which may be removed. To insert the pot and replace the bottom is a difficult operation. Providing a separate bottom increases the cost and complicates the construction. With a separate bottom it is necessary to have two types of material available, that is rod-like material for the cage and also sheet metal for the bottom support. This increases the number of parts and adds to the expense of construction.

In my Patent 2,350,922, issued June 6, 1944, I describe and claim a support of the cage type having a construction which avoids all of the above difficulties. The present application is a continuation-in-part of the application above identified and is directed to the method for making an ornamental support or holder of the type described.

A holder or support of the type described comprises a top and bottom section made of basket-like form, each section comprising a pair of spaced ring members of different diameters, and including a plurality of rod-like elements extending between the ring members, the rod-like elements contacting the smaller ring members forming radially inwardly extending fingers lying in a common plane. One section is inverted over the top of the other section to form the cage, the two sections being held in registering contact with flexible deformable strips wrapped around the contacting ring members for maintaining the top and bottom sections in contact.

In making devices of this kind the various elements have in the past been preformed, then assembled and welded together in separate steps. This was time-consuming and did not facilitate the use of handy jigs, thus increasing the expense and time of assembly.

It is the principal object of the present invention to provide an improved method of manufacturing a device of the kind described.

A further object of my invention is to provide such a method which will facilitate the use of jigs and welding equipment to decrease the time of assembly and manufacture.

A still further object of my invention is to provide jig and welding equipment for manufacturing said devices.

Figure 2:
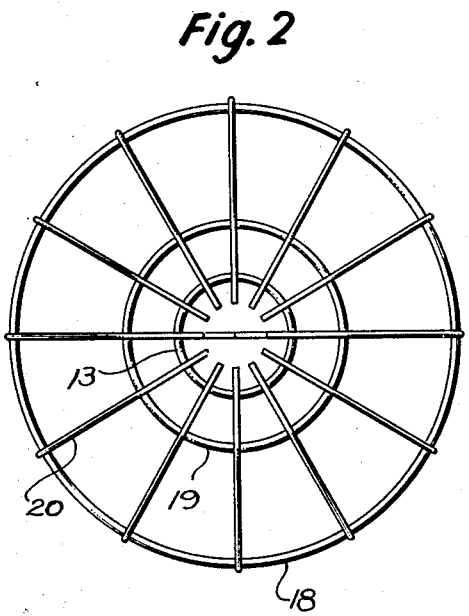
Figure 3:
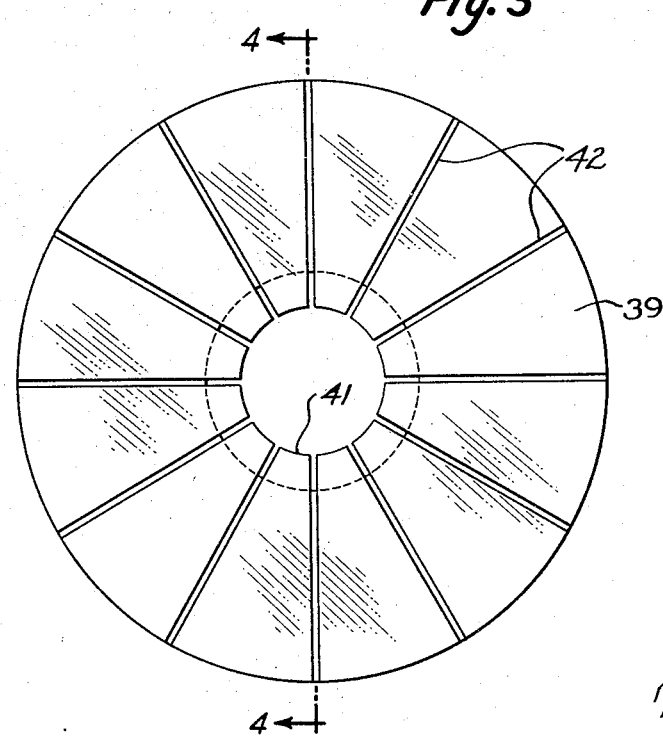
Figure 4:
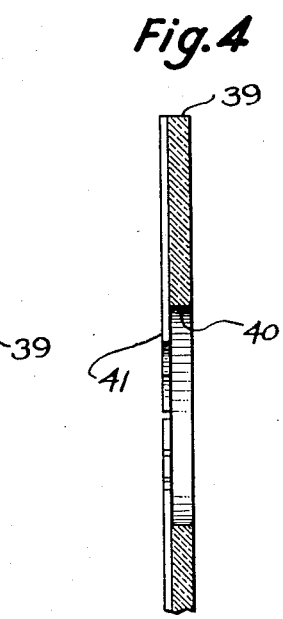

The novel features which I believe to be characteristic of my invention are set forth with particularity in the appended claims but the invention itself will best be understood by reference to the following description taken in connection with the accompanying drawing in which Figure 1 is a side elevation of an ornamental support made according to my invention, Figure 2 is a bottom view of Figure 1, Figures 3 and 4 show details of a fixture used in connection with the jig and welding equipment for manufacturing devices made according to my invention, Figure 5 shows a jig and welding assembly made according to my invention, Figures 6 and 7 show steps in the formation of an ornamental support made according to my invention, and Figure 8 is a view of a jig and welding arrangement made according to my invention and used in another step of the method of making an ornamental support in accordance with my invention.

Referring to Figure 1, the ornamental support in form of a bird cage enclosure consists of two sections, an upper section 10 and lower section 11. Referring first to the top section which comprises spaced rim or ring members 12—13 having extending between them the rod-like elements 14, the upper ends of which are bent around the ring member 13 to lie radially in a common plane transverse to the axis of the cage. One of the elements 14 may be extended at 16 to provide an inverted V-shaped support element engaged by bracket 17 when hung in position. It is understood that the V-shaped supporting element could be a separate element.

The lower section of the support or holder is made much like the top section and comprises spaced ring or rim members 18–19, having extending between them rod-like elements 20, the lower free ends of which are bent to extend radially inward in a common plane to form a supporting base for containing, for example, a flower pot or the like. The two larger rim members 12 and 18 are positioned in registering contact and maintained in locked arrangement by means of locking members 22 which may be flexible deformable strip members.

Thus, in shipment the two sections may be separated from each other and shipped in nested arrangement, thereby requiring a small space in comparison with the conventional type devices of this kind, it being possible to assemble the same after the shipment has reached its destination. Because of the fact that the two sections may be easily separated, any container, such as a flower pot or the like, can be placed in the lower section without danger of breaking any part of the flower or the like, and the two parts may then be assembled together. This construction eliminates the need for a door at the side, thus simplifying the construction and decreasing the cost. It also eliminates the necessity for having two types of raw material available for construction, that is both rod-like elements and sheet metal.

Devices of the type described may be assembled according to my invention as shown in Figures 5 to 8, inclusive. Rod-like elements are positioned radially about the common center in a common plane, as best shown in Figure 6, inward radial movement being limited by contact of the inner ends of the rod-like element 20 against a mandrel, for example such as mandrel 20', so that the ends of the rod-like elements terminate in a common circle. In this position the ring element 19 may be placed over the rods and coaxial with the mandrel and secured to the rods, for example, by welding. The above step may of course be reversed, that is the ring may be positioned coaxially of the mandrel and then the rods placed radially in position above the ring and welded to the ring. The ring is then fixed in a position and the rod-like elements 20 bent to lie in vertical planes passing radially through a common center of the rod-like elements to form the structure shown in Figure 8. After the rods are bent to shape, the top ring 18 is secured to the free ends of the rods so as to form a truncated or cup-shaped section, such as shown in Figure 8. Both sections may be formed in the same manner, the rod-like element having the V-shaped supporting section 16 being secured after the forming of the other elements.

In order to facilitate the assembly and manufacture of a device made according to my invention, I provide an assembly and welding jig arrangement shown in Figure 5. It comprises a base 30 having supporting legs 31 disposed around a common center. Mounted at the top of the legs is a conducting flat plate-like member 31', which forms one of the electrodes of a welding apparatus. Positioned centrally of the above arrangement is a mandrel or core 32 of conducting material surrounded by an electromagnetic coil 33 provided with insulating inner and outer cover members 37-38. This coil may be energized by means of conductors 35-36. Positioned over and supported by the plate 31' is a fixture or jig plate 39, as best shown in Figures 3 and 4, provided with a plurality of radially directed slots 42 and having a central opening. This platen or plate is provided with a recessed portion 40 so as to provide overlapping fingers 41 which engage the top surface of the electrode 31' and support the platen in the position shown in Figure 5, a central well-like depression being provided between the top surface of the electrode 31' and the top surface of the platen 39. Welding electrode 43 is supported above and in movable relationship with the electrode 31', the welding current being supplied by the conductors 32' and 43'.

To assemble the sections the rod-like element 20 may be positioned in the slots 42, the ends being at varying distances from the mandrel 32 and the ring disposed above these rods, or the ring may be first positioned within the well and the rods laid over the ring in the slots. In either case the rods are quickly registered with the periphery of the mandrel by energizing the electromagnet, which immediately draws all of the rods to the same radial distance from the axis of the mandrel, thereby positioning the ends of the rods in proper relationship with respect to the ring. The welding electrodes are then clamped together and welding current sent through the ring and rods to weld them in proper relationship, as shown in Figure 7.

This assembly of elements is then positioned over a rotatable mandrel 45, having cone-shaped end 46, and a die 47 is brought down into engagement with the mandrel 45 to form the rods as shown. The ring 18 may then be welded to the ends of the rods 20 by means of the welding jaws 49 and 50 properly positioned with respect to the mandrel, the mandrel being rotated and the welds being made at the end of each of the rods 20. The mandrel may, of course, be provided with a registering device so that each successive rod is brought into the proper position for welding.

The top assembly may be made in the same fashion and the element 16 added later, after the basket is formed. The two sections may then be fastened together as described above.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What I claim as new is:

1. A method of making a wire cage supporting device consisting of the steps of positioning a plurality of rod-like elements radially about a common center in a common plane with their ends at random distances from said center, electromagnetically and simultaneously adjusting the inner ends of said elements to lie in a circle of predetermined diameter, positioning of rim element of larger diameter than said circle over said rod-like elements and coaxial with the common center about which said rod-like elements are positioned, whereby the inner ends of said rod-like elements extend within said rim element, securing said rim element to said rod-like elements, forming the portions of said rod-like elements outside the rim element to positions lying in vertical planes passing radially through said common center and securing a second rim element to the top ends of the rod-like elements.

2. The method of making a wire supporting device and utilizing a jig plate having a central aperture and a plurality of spaced radially directed slots communicating with the aperture and magnetic means extending through said aperture, said method including the steps of positioning a plurality of rod-like elements within said slots at random to lie radially about a common center in a common plane, magnetically adjusting the inner ends of said rod-like elements to lie in a circle of predetermined diameter, positioning within said aperture over said rod-like elements a rim element of larger diameter than said circle and coaxial with the common center about which said rod-like elements are positioned, whereby the inner ends of said rod-like elements extend within said rim element, securing said rim element to said rod-like elements, forming the portions of said rod-like elements outside the rim element to positions lying in vertical planes passing radially through said common center and securing a second rim element to the top ends of said rod-like elements.

3. The method of making a wire supporting device and utilizing a jig plate having a central aperture and a plurality of equally spaced radially directed open slots communicating with said aperture and electromagnetic means extending through said aperture, said method including the steps of positioning a plurality of rod-like elements within said slots at random to lie radially about a common center in a common plane, electromagnetically and simultaneously adjusting the inner ends of said rod-like elements to lie in a circle of predetermined diameter, positioning within said aperture over said rod-like elements a rim element of larger diameter than said circle and coaxial with the common center about which said rod-like elements are positioned, whereby the inner ends of said elements extend within said rim element, welding said rim element to said rod-like elements, removing said rod-like elements and said rim elements from said jig, forming the portions of said rod-like elements outside the rim element to positions lying in vertical planes passing radially through said common center and securing a second rim element to the top ends of said rod-like elements.

4. The method of making a wire supporting device and utilizing a jig plate having a central aperture of predetermined diameter and a plurality of spaced radially directed open slots communicating with said aperture and electromagnetic means extending through said aperture, said method including the steps of positioning a plurality of rod-like elements within said slots to lie radially about a common center in a common plane, electromagnetically and simultaneously adjusting the inner ends of said rod-like elements to lie in a circle of predetermined diameter, positioning within said aperture over said rod-like elements a rim element of larger diameter than said circle and substantially that of said aperture for automatic positioning coaxial with the common center of said rod-like elements, whereby the inner ends of said rod-like elements extend within said rim element, securing said rim element to said rod-like elements, removing said rod-like elements and said rim element from said jig, simultaneously forming the portions of said rod-like elements outside the rim element to positions lying in vertical planes passing radially through said common center and securing a second rim element to the top ends of said rod-like elements.

5. The method of making a wire supporting device and utilizing a jig plate having a central aperture and a plurality of spaced radially directed open slots communicating with said aperture and electromagnetic means extending through said aperture, said method including the steps of positioning a plurality of rod-like elements within said slots at random to lie radially about a common center in a common plane, electromagnetically and simultaneously adjusting the inner ends of said rod-like elements to lie in a circle of predetermined diameter, positioning within said aperture over said rod-like elements a rim element of larger diameter than said circle and coaxial with the common center about which said rod-like elements are positioned, whereby the inner ends of said elements extend within said rim element, securing said rim element to said rod-like elements, removing said rod-like elements and said rim element from said jig, simultaneously forming the portions of said rod-like elements outside the rim element to positions lying in vertical planes passing radially through said common center, securing a second rim element to the top ends of said rod-like elements, and securing two of the finished sections together with their open ends in contacting registering relationship.

PAUL H. PLANETA.

REFERENCES CITED

The following references are of record in the file of this patent:

UNITED STATES PATENTS

| Number | Name | Date |
|---|---|---|
| 524,168 | Galster | Aug. 7, 1894 |
| 820,716 | Haynes et al. | May 15, 1906 |
| 940,899 | Sherrer | Nov. 23, 1909 |
| 1,445,231 | Muller | Feb. 13, 1923 |
| 1,447,792 | Lachman et al. | Mar. 6, 1923 |
| 1,697,789 | Snyder | Jan. 1, 1929 |
| 1,815,982 | Little | July 28, 1931 |
| 1,854,206 | Little | Apr. 19, 1932 |
| 2,109,724 | Genebach | Mar. 1, 1938 |
| 2,180,486 | Tench | Nov. 21, 1939 |